(12) United States Patent
Bourd et al.

(10) Patent No.: US 7,505,043 B2
(45) Date of Patent: Mar. 17, 2009

(54) CACHE EFFICIENT RASTERIZATION OF GRAPHICS DATA

(75) Inventors: Alexei V. Bourd, San Diego, CA (US); Shuaib Uddin Arshad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 10/930,408

(22) Filed: Aug. 30, 2004

(65) Prior Publication Data

US 2006/0044317 A1 Mar. 2, 2006

(51) Int. Cl.
*G09G 5/36* (2006.01)
*G06T 15/40* (2006.01)
*G06T 1/00* (2006.01)

(52) U.S. Cl. .................. 345/557; 345/421; 345/418
(58) Field of Classification Search ................ 345/557, 345/530, 421, 418, 501
See application file for complete search history.

(56) References Cited

U.S. PATENT DOCUMENTS

| | | | |
|---|---|---|---|
| 5,600,763 A | | 2/1997 | Greene et al. |
| 6,215,507 B1 * | | 4/2001 | Nally et al. .................. 345/568 |
| 6,326,964 B1 * | | 12/2001 | Snyder et al. ................ 345/419 |
| 6,359,623 B1 * | | 3/2002 | Larson ........................ 345/501 |
| 6,421,053 B1 * | | 7/2002 | Johns et al. .................. 345/441 |
| 6,674,443 B1 * | | 1/2004 | Chowdhuri et al. ......... 345/557 |

OTHER PUBLICATIONS

Hakura, Z., et al. "The Design and Analysis of a Cache Architecture for Texture Mapping," Computer Architecture News, ACM, New York, NY, US, vol. 25, No. 2, pp. 108-120 (May 1997) XP000656571, ISSN: 0163-5964.
Matos, A., et al., "Cache Management for Real Time Visualization of 2D Data Sets," IEEE 1998, Rio de Janeiro, Brazil, pp. 111-118, XP10309786A.
International Search Report—PCT/US05/030931, International Search Authority, European Patent Office, Jul. 3, 2006.

* cited by examiner

*Primary Examiner*—Kee M Tung
*Assistant Examiner*—Joni Hsu
(74) *Attorney, Agent, or Firm*—Timothy F. Loomis; Matthew J. Evans; Thomas R. Rouse

(57) ABSTRACT

A cache stores data for use in rasterizing graphics data. The size of the cache is equal to a selected tile size. A processor performs the rasterization of the graphics image by subdividing the graphics image into a plurality of sub-blocks. The sub-blocks are processed, based on a block processing order, by further subdivision of the sub-blocks into tiles for those sub-blocks that have graphics image data. The tiles have a size equal to the selected tile size. Data, associated with a tile, is loaded into the cache, and the cache data is utilized to generate pixels for the associated tile of the graphics image.

50 Claims, 12 Drawing Sheets

CACHE EFFICIENT RASTERIZATION OF GRAPHICS DATA

BACKGROUND

1. Field

The invention is directed towards a method and apparatus for cache efficient rasterization of graphics data.

2. Background

To prepare a graphic for display or printing, graphics data is rasterized to convert the graphics data into an array of pixels (bitmap) that is then used to display or print the graphics. FIG. 1 shows a conceptual diagram of an environment 100 in which rasterization is performed. The environment 100 includes a micro-processing unit (MPU) 105, a storage device 110, a cache 115, a frame buffer 120, and an output device 125.

The MPU 105 may comprise a central processing unit (CPU) of a host computer (e.g., desktop or laptop computer, server, gaming console, cellular telephone, etc.) or be part of a graphics device (e.g., graphics accelerator) dedicated specifically for graphics production or a digital signal processing (DSP) unit tailored to performing digital signal processing algorithms. The storage device 110 may comprise various forms of memory resources, such as a permanent storage device, a mass-storage device, a removable storage device, a volatile read-and-write memory, such as a random access memory (RAM), etc.

The MPU 105 loads and executes program instructions of an application 130 to produce streams of graphics data 132. Program instructions of the graphics application 130 and generated graphics data 132 are stored to and read from the storage device 110. The generated graphics data describes a graphic (text or images) to be displayed and can be in various forms, such as equations, coordinates of vectors, vector drawings, etc. Graphics data may include any of several types of data describing a graphic, such as color, texture, depth (z) data.

After the graphics data 132 is generated, the MPU 105 prepares the graphics data for display by rasterizing the graphics data to produce a bitmap 135. During the rasterization process, the MPU 105 loads and analyzes the graphics data to produce the bitmap 135. For example, the MPU 105 may analyze depth (z) data to determine which elements of the graphic are visible and which elements of a graphic are occluded (blocked from view by other elements of the graphic). The MPU 105 may also analyze color and texture data to determine the color and texture components of the graphic. Such analysis determinations by the MPU 105 are reflected in the generated bitmap 135.

The generated bitmap 135 is stored in the frame buffer 120 and is used to display or print an image on the output device 125 (e.g., a display monitor or printer). The frame buffer 120 is typically an area of memory in a memory resource (such as the storage device 110) used to store a bitmapped graphic while the graphic is being displayed or printed on the output device 125.

During the rasterization process discussed above, the MPU 105 transfers graphics data to be rasterized from the storage device 110 to the cache 115 which the MPU 105 can typically access in a significantly shorter time than it can access the storage device 110. The MPU 105 then loads the graphics data from the cache 115 and rasterizes the graphics data to produce the bitmap 135. If the MPU later requires particular graphics data during the rasterization process, the MPU first determines if the particular graphics data is stored in the cache 115 since the access time to the cache 115 is shorter than the storage device 110. A "cache hit" occurs if the particular graphics data exists in the cache, whereby the particular graphics data is then retrieved from the cache. A "cache miss" occurs if the particular graphics data does not exist in the cache, whereby the particular graphics data must then be transferred from the storage device 110 to the cache 115 which consumes more time and energy as compared to direct retrieval from the cache 115. As such, it is advantageous for graphics data to be retrieved directly from the cache 115 during the rasterization process as much as possible since this reduces the amount of time and energy needed. This is especially true when rasterization is being performed in a portable device (such as a laptop computer, cellular telephone, etc.) where battery power is at a premium.

Typically, however, the rasterization process is performed in an inefficient manner where a large number of graphics data transfers from the storage device to the cache are needed. This is due to this fact that conventional methods of rasterization do not maximize the transfer of graphics data to the cache where most or all of the graphics data transferred to the cache is rasterized before further graphics data is needed from the storage device. Typically then, a significant portion of the graphics data that has been loaded to the cache is not processed and discarded and then replaced by other graphics data that has been loaded from the storage device.

As such, there is a need for techniques to rasterize graphics data in an efficient manner where transfers of graphics data from the storage device to the cache are optimized so that a fewer number of graphics data transfers are needed. This would reduce the time and energy needed to perform the rasterization process.

SUMMARY

Graphics data, which describes an image, is processed for rasterization. A block (pixel array) of graphics data is analyzed in a "Z" pattern order based on a binary search subdivision process to determine a rasterization order for sub-blocks (sub-pixel arrays) of the image. In some embodiments, the sides of the block and sub-blocks have a length (in terms of pixels) that is a power of 2. The technique determines an order of analysis for sub-blocks of the image using a recursive process (binary search subdivision process) that recursively divides sub-blocks into further sub-blocks until the sub-blocks match a predetermined tile size. The sides of each resulting sub-block also have a length (in terms of pixels) that is a power of 2. In some conditions, the technique then loads graphics data associated with a sub-block (having a size equal to the tile size) to a cache for rasterization. In some embodiments, pixels of block are rasterized in a "Z" pattern scanning order that is also based on a binary search subdivision process.

The tile size is determined based on the size of the cache. In some embodiments, the tile is a square having sides with a length (in terms of pixels) that is a power of 2. In some conditions, the technique loads graphics data for a tile (sub-block) having a predetermined tile size to a cache for rasterization. In some embodiments, the cache size supports the tile size so that all graphics data associated with the tile can be concurrently stored to the cache. In some embodiments, the tile is rasterized from the cache before other graphics data is loaded to the cache.

Methods of the present invention provide an efficient way to load graphics data to a cache and rasterize the graphics data from the cache. Since the tile size is based on the cache size, most or all of the graphics data concurrently stored to the cache is rasterized before further graphics data is loaded to the cache from the storage device. As such, data transfers to the cache are optimized and the number of graphics data transfers to the cache is reduced. Also, the order of processing of the sub-blocks of an image is determined by a "Z" pattern order based on a binary search subdivision process which provides an efficient order of analysis and rasterization of the sub-blocks.

Further, the techniques provide for efficient processing of graphics data through use of sub-blocks and tiles having sizes (in terms of pixels) that are a power of 2. As such, calculations required in the processing of the graphics data are simplified in that complex binary division operations are reduced and are mostly replaced by simple and fast shift operations. The simplified shift operations may be used, for example, in the recursive processes (binary search subdivision process) that recursively divides sub-blocks into further sub-blocks or when determining if a particular sub-block overlaps an image.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
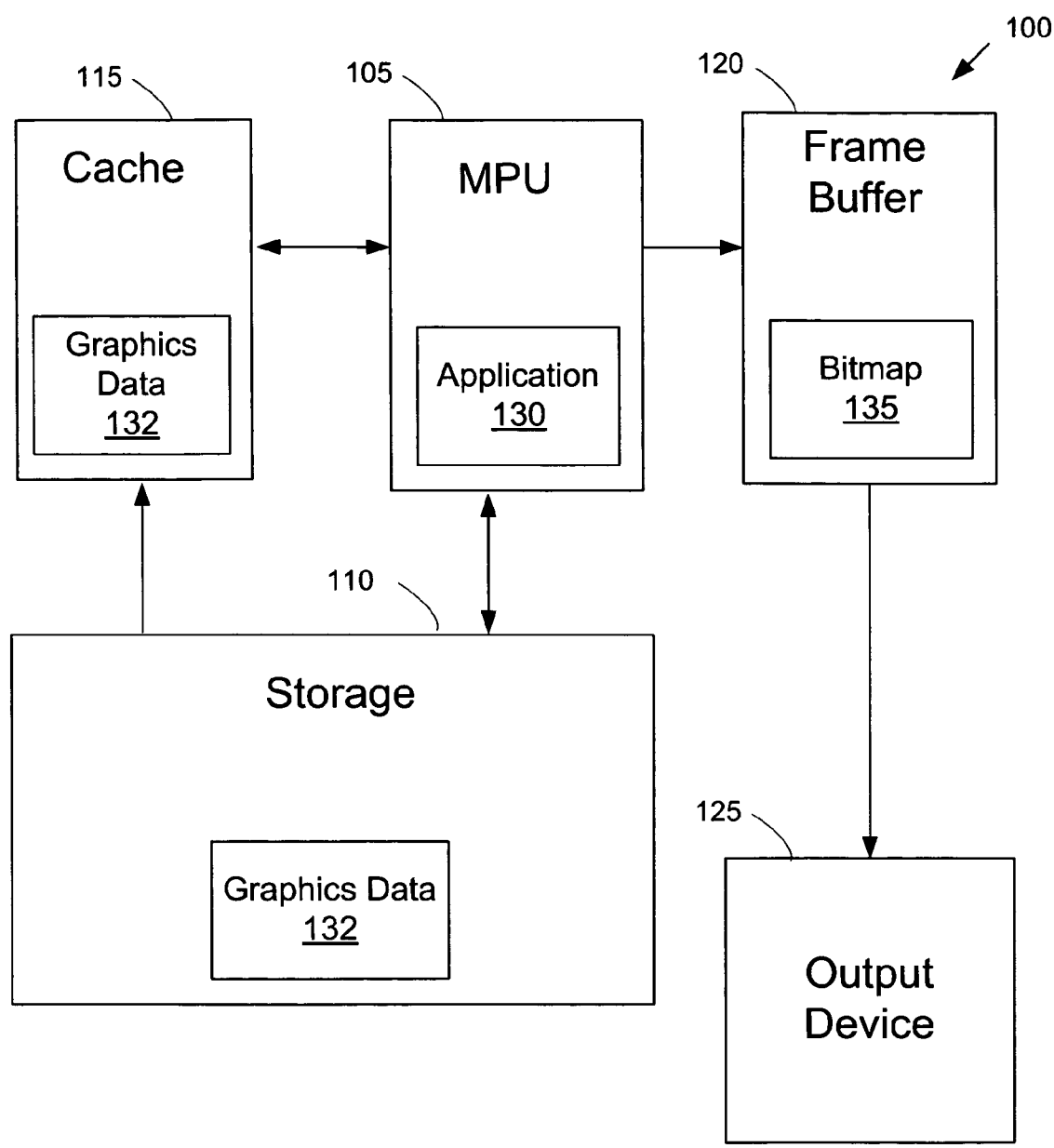
FIG. 1 shows a conceptual diagram of an environment in which rasterization is performed.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Graphics data, which describes an image, is processed for rasterization. The technique analyzes a block (pixel array) of graphics data in a "Z" pattern order based on a binary search subdivision process to determine a rasterization order for sub-blocks (sub-pixel arrays) of the image. In some embodiments, the sides of the block and sub-blocks have a length (in terms of pixels) that is a power of 2. The technique determines an order of analysis for sub-blocks of the image using a recursive processing technique (binary search subdivision process) that recursively divides sub-blocks into further sub-blocks until the sub-blocks match a predetermined tile size. The sides of each resulting sub-block also have a length (in terms of pixels) that is a power of 2. In some conditions, the technique then loads graphics data associated with a sub-block (having a size equal to the tile size) to a cache for rasterization. In some embodiments, pixels associated with a block are rasterized in a "Z" pattern scanning order that is also based on a binary search subdivision process.

The tile size is determined based on the size of the cache. In some embodiments, the tile is a square having sides with a length (in terms of pixels) that is a power of 2. In some conditions, the technique loads graphics data for a tile (sub-block) having a predetermined tile size to a cache for rasterization. In some embodiments, the cache size supports the tile size so that all graphics data associated with the tile can be concurrently stored to the cache. In some embodiments, the tile is rasterized using the cache data before other graphics data is loaded into the cache.

The techniques, disclosed herein, provide an efficient way to load graphics data to a cache and rasterize the graphics data from the cache. Since the tile size is based on the cache size, most or all of the graphics data concurrently stored to the cache is rasterized before further graphics data is loaded to the cache from the storage device. As such, data transfers to the cache are optimized and the number of graphics data transfers to the cache is reduced. Also, the order of processing of the sub-blocks of an image is determined by a "Z" pattern order based on a binary search subdivision process which provides an efficient order of analysis and rasterization of the sub-blocks.

Further, the techniques provide for efficient processing of graphics data through use of sub-blocks and tiles having sizes (in terms of pixels) that are a power of 2. As such, calculations required in the processing of the graphics data are simplified in that complex binary division operations are reduced and are mostly replaced by simple and fast shift operations. The simplified shift operations may be used, for example, in recursive processing (binary search subdivision process) that recursively divides sub-blocks into further sub-blocks or when determining if a particular sub-block overlaps an image.

The description of the invention below includes a general technique for processing graphics data for rasterization, as discussed in Section I. The description also includes recursive processing that processes sub-blocks of an image according to a "Z" pattern order based on a binary search subdivision process, as discussed in Section II. The description further includes a recursive associating technique that specifies a scanning order for pixels of block according to a "Z" pattern order based on a binary search subdivision process, as discussed in Section III.

Section I: Processing Graphics Data for Rasterization

Figure 2:
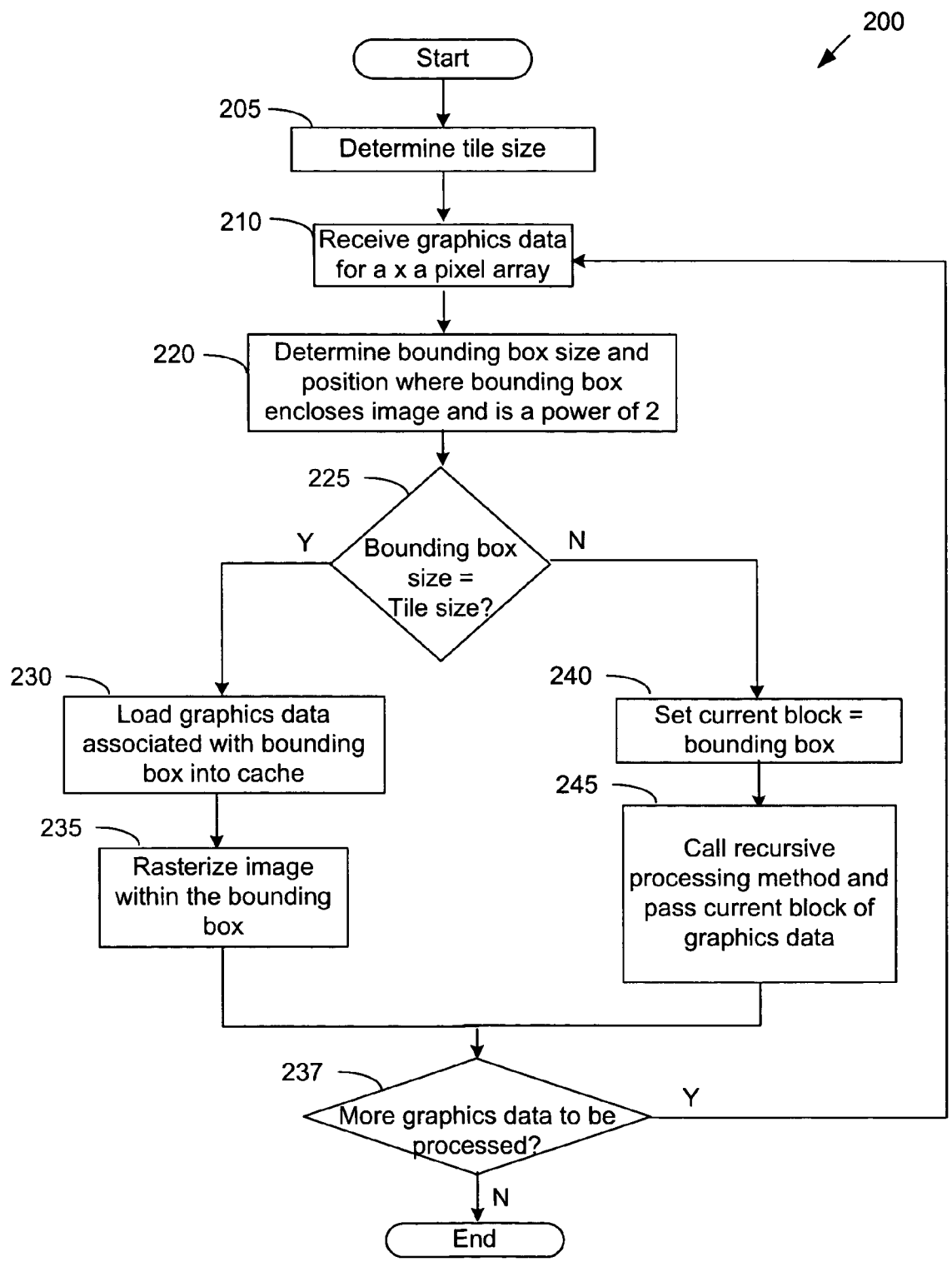
FIG. 2 is a flowchart for processing a graphics data stream for rasterization.
Figure 3A:
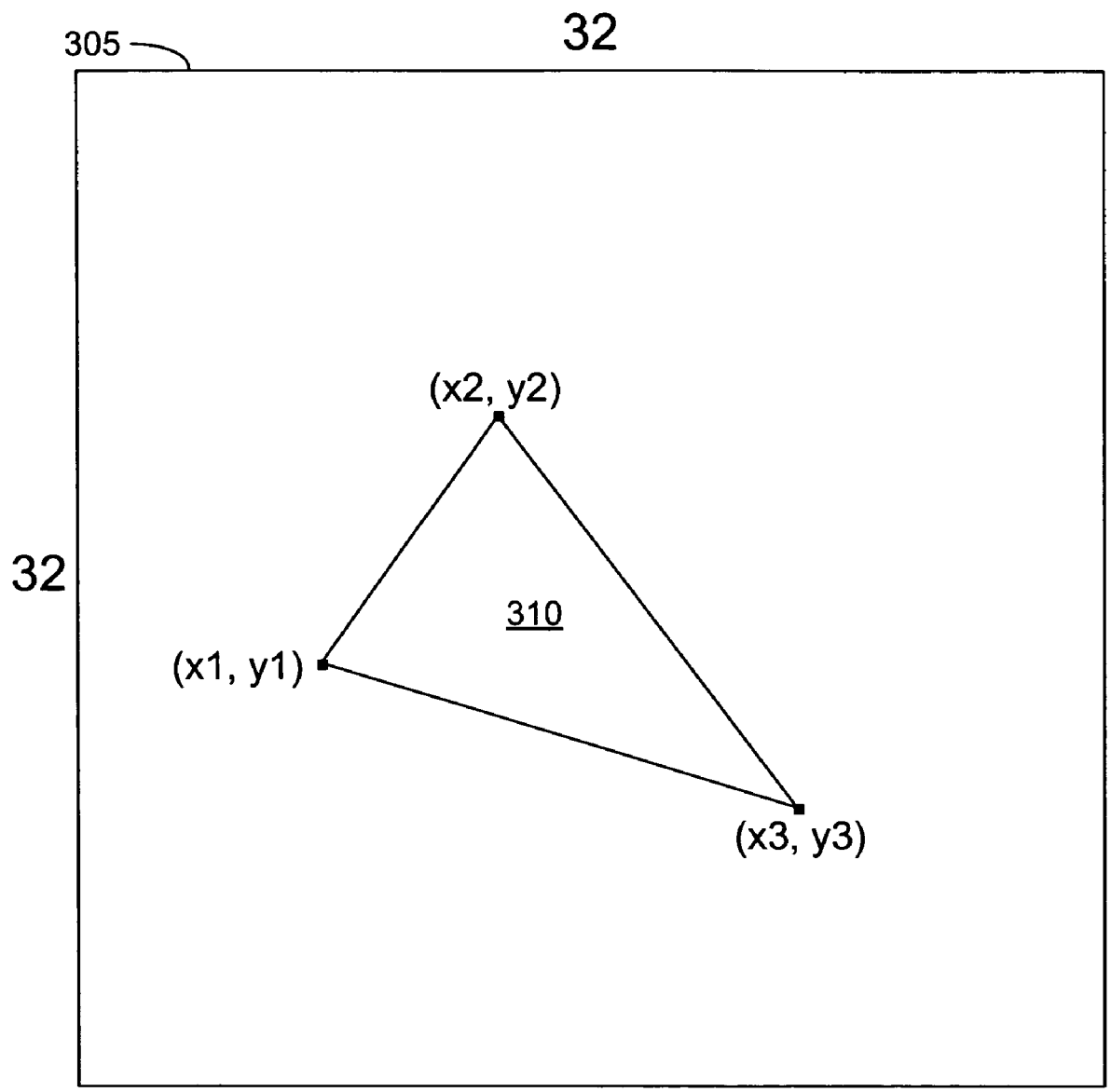
FIGS. 3A-B show conceptual diagrams of an example image as it is processed.
Figure 3B:
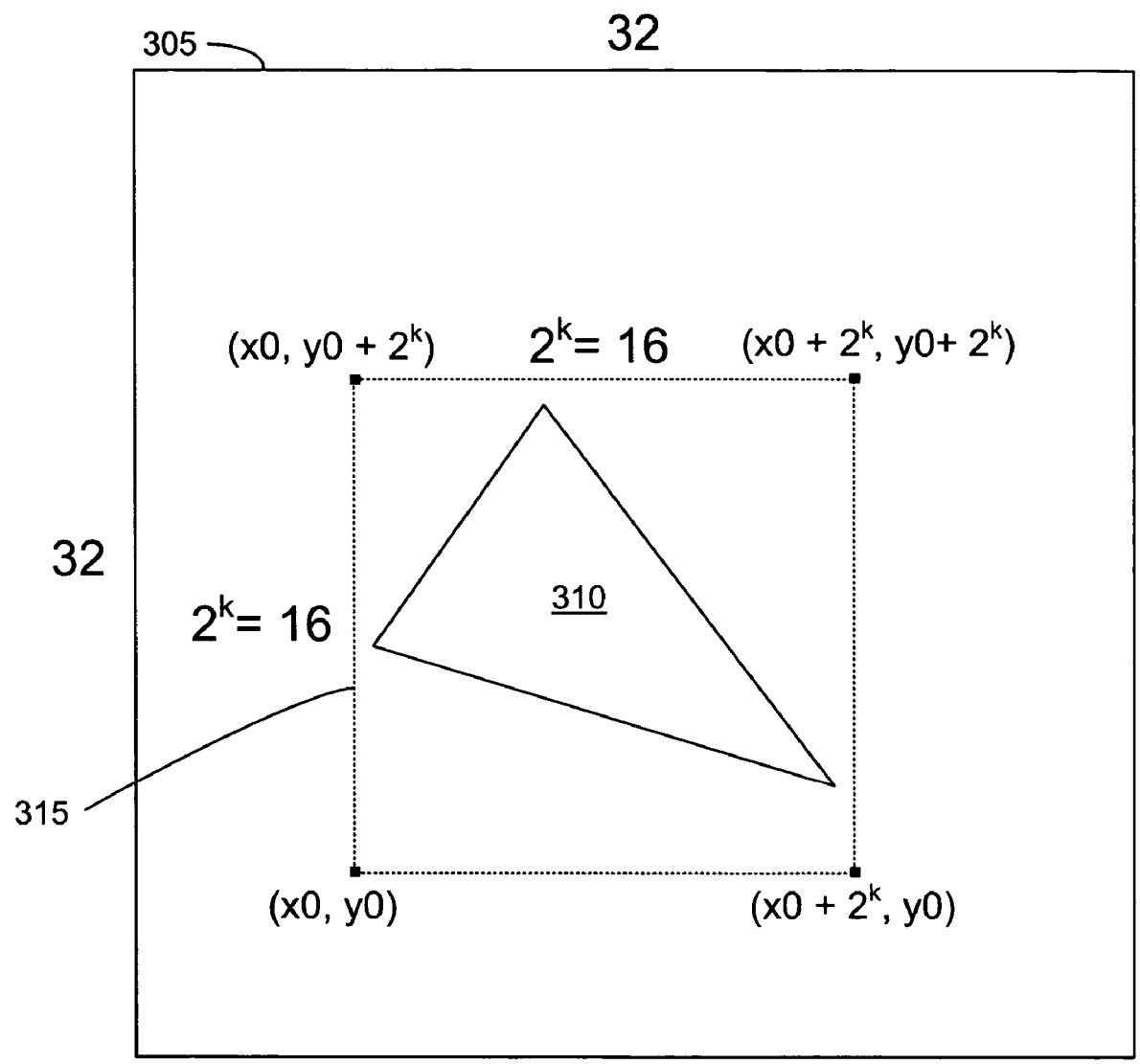

FIG. 2 is a flowchart of a general technique 200 for processing a graphics data stream for rasterization. The general technique 200 analyzes an image (as described by graphics data) in a "Z" pattern order to determine a rasterization order for sub-blocks of the image. The general technique 200 is used in conjunction with an application that generates a graphics data stream, a storage device that stores the generated graphics data, and a cache that temporarily stores portions of graphics data for rasterization. The general technique 200 is described in relation to FIGS. 3A-B. FIGS. 3A-B show conceptual diagrams of an example image as it is processed by the general technique 200.

The process begins by determining (at 205) a tile size (pixel array size) based on the size of a cache that will be used to temporarily store graphics data during processing of graphics data by the general technique 200. The tile size is correlated to the cache size and is determined so that the cache size can support the tile size (i.e., the cache size can concurrently store all data associated with a single tile). The tile size is determined by the amount of data required for each pixel of the tile (which varies depending on color quality, presence of texture data or depth data, etc.).

The tile size may also be adjusted/affected by the application generating the graphics data and the size of triangle images used by the application to generate images. Typically, an application generates graphics data describing an image as a composite of multiple triangle images. The size of the triangle images used to compose an image varies depending on the application. In some embodiments, the determined tile size is reduced for applications using relatively small triangle images and increased for applications using relatively large triangle images.

In some embodiments, the tile is a square with sides having a length (as measured in pixels) that is a power of 2 ($2^t$), the tile comprising a $2^t \times 2^t$ pixel array. As used herein, a tile refers to a pixel array of a predetermined size. However, as used herein, a tile may also refer to a sub-block of an image having a size (in terms of pixels) matching the predetermined size of the tile.

The general process 200 then receives (at 210) graphics data (from the graphics data stream) for an a×a pixel array having a predetermined size. FIG. 3A shows a conceptual diagram of an example image 310 of a received pixel array 305. In the example of FIG. 3A, the received pixel array 305 is a 32×32 array containing a triangle image 310 to be displayed.

The process 200 then determines (at 220) a size and position of a bounding box that encloses the image. In some embodiments, the bounding box is a square with sides having a length (as measured in pixels) that is a power of 2. FIG. 3B shows a conceptual diagram of an example bounding box 315 enclosing the image 310. In the example of FIG. 3B, the bounding box 315 comprises a 16×16 pixel array (having sides of $2^k$ pixels, where k=4). A process 400 for determining the size and position of the bounding box 315 is discussed below in relation to FIG. 4.

The process 200 then determines (at 225) whether the size (in terms of pixels) of the bounding box is equal to the tile size (determined at step 205). If so, the process 200 loads (at 230) graphics data associated with the bounding box and describing an image within the bounding box from the storage device to the cache. The process then rasterizes (at 235) the image contained within the bounding box (as described by the associated graphics data loaded to the cache). The image of the bounding box can be rasterized without further data loads from the storage to the cache since the cache size supports the bounding box size. This is due to the fact that since the cache size supports the tile size, it also supports the bounding box size since it has been determined (at 225—Yes) that the bounding box size is equal to the tile size. In some embodiments, the entire image of the bounding box is rasterized before more graphics data is loaded to the cache.

The process then determines (at 237) whether there is more graphics data in the graphics data stream to be processed. If so, the process continues at step 210 where it receives graphics data for a next a×a pixel array. If not, the process ends.

If it is determined (at 225—No) that the size of the bounding box is not equal to the tile size, the process then sets (at 240) a current block as the bounding box. The process then calls (at 245) a recursive processing technique (as described below in relation to FIG. 5) and passes the current block (bounding box) of graphics data to the recursive processing technique. The recursive processing technique analyzes and rasterizes sub-blocks of the current block in an efficient order. In some embodiments, the recursive processing technique processes sub-blocks of the current block according to a "Z" processing pattern based on a binary search subdivision process. The process then determines (at 237) whether there is more graphics data in the graphics data stream to be processed. If so, the process continues at step 210 where it receives graphics data for a next a×a pixel array. If not, the process ends.

Figure 4:
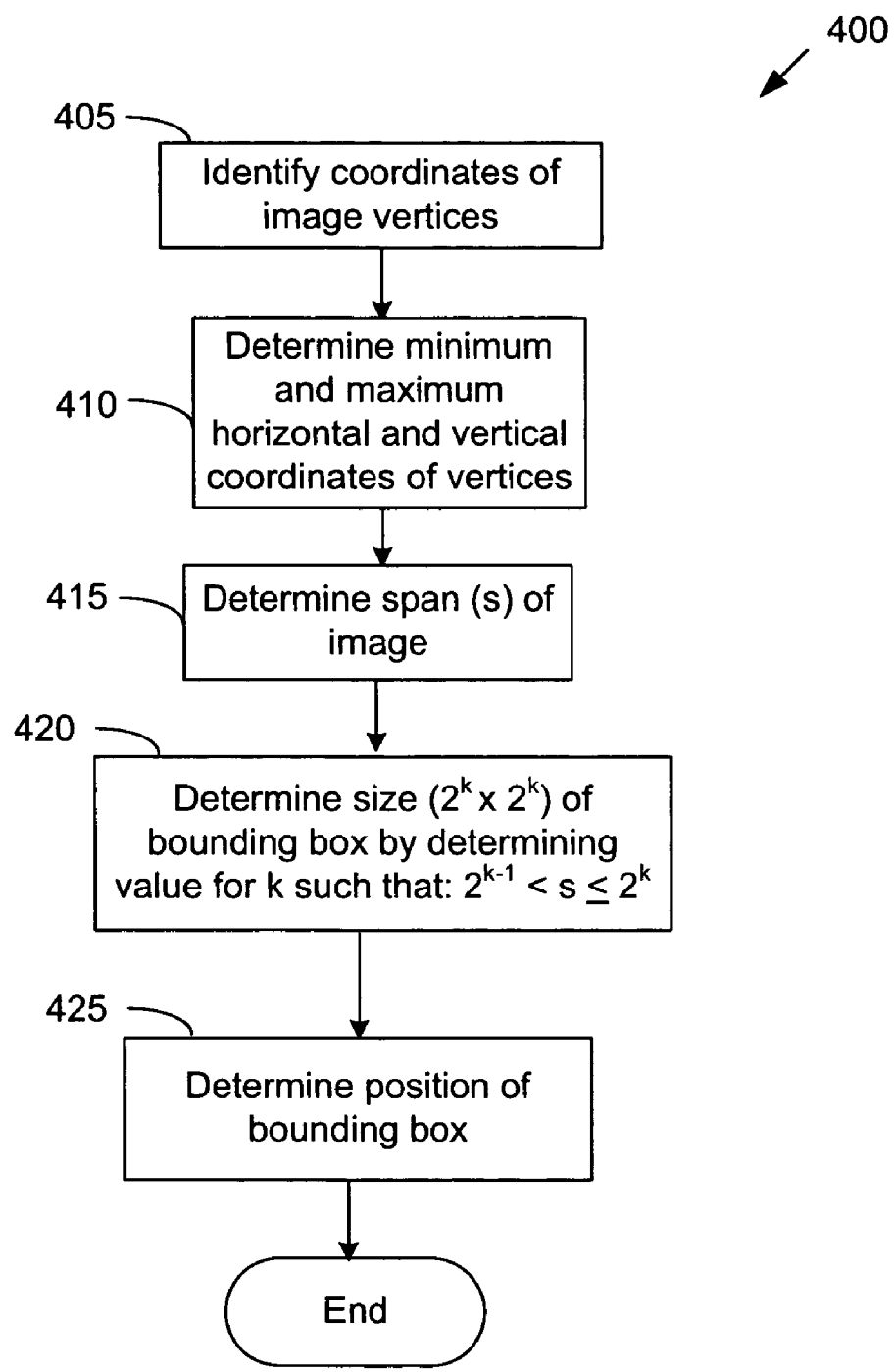
FIG. 4 is a flowchart of a process for determining a size and position of a bounding box enclosing an image to be displayed.

FIG. 4 is a flowchart of a process 400 for determining a size and position of a bounding box enclosing an image to be displayed. The process 400 comprises step 220 of the general process 200. The process 400 is described in relation to FIG. 3A-B. Although the process 400 relates to an image that is a triangle, one with knowledge in the arts will realize that the process 400 can be easily adapted to determine bounding boxes enclosing images of other shapes or forms. Also, the process 400 assumes that the triangle image is specified by horizontal and vertical coordinates (($x_1,y_1$), ($x_2,y_2$), ($x_3,y_3$)) of the vertices of the triangle. One with knowledge in the arts will realize, however, that the triangle image may be specified in other ways.

In some embodiments, the bounding box is a square having the smallest size possible to enclose the image but yet also has sides with a length (in terms of pixels) that are power of 2 (i.e., is the smallest square with sides that are a power of 2 that encloses the image). The length of a side of the bounding box is expressed as $2^k$ so that the bounding box comprises a $2^k \times 2^k$ pixel array.

The process 400 begins by identifying (at 405) the horizontal and vertical coordinates of the vertices of the triangle image (($x_1,y_1$), ($x_2,y_2$), ($x_3,y_3$)). In some embodiments, the horizontal and vertical coordinates are in terms of pixel coordinates of the pixel array that contains the triangle image. An example of this step is shown in FIG. 3A.

The process then determines (at 410) the minimum and maximum horizontal and vertical coordinates of the identified vertices. In equation form, the process determines the following:

$x_{min} = \min(x_1, x_2, x_3)$;

$x_{max} = \max(x_1, x_2, x_3)$;

$y_{min} = \min(y_1, y_2, y_3)$; and $y_{max} = \max(y_1, y_2, y_3)$.

For example, for the image 310 shown in FIG. 3A, the process may determine the following: $x_{min} = x_1$, $x_{max} = x_3$, $y_{min} = y_3$, and $y_{max} = y_2$.

The process then determines (at 415) the span (s) of the image. The span is the longer of the horizontal length (as measured in pixels) or the vertical length (as measured in pixels) of the image. In equation form, span (s) is expressed as: $s = \max(x_{max} - x_{min}, y_{max} - y_{min})$. For example, for the image 310 shown in FIG. 3A, the process would determine the following: $s = \max(x_3 - x_1, y_2 - y_3) = (x_3 - x_1)$. As such, in the example of FIG. 3A, the horizontal length of the image determines the span as it is longer than the vertical length of the image.

The process then determines (at 420) a number k such that: $2^{k-1} < s \leq 2^k$. The value of k determines the size of the bounding box where the bounding box comprises a $2^k \times 2^k$ pixel array and has a side of length $2^k$. For example, as shown in FIG. 3B, the value of k is determined to be 4 so that the sides of the bounding box 315 are 16 pixels long (the bounding box 315 comprising a 16×16 pixel array).

The process then determines (at 425) the position of the bounding box. In some embodiments, the process does so by determining a number $x_0$ such that:

$$x_0 = 2^t n;$$

$$x_0 \leq x_{min}; \text{ and}$$

$$2^t(n+1) > x_{min}.$$

The process also determines a number $y_0$ such that:

$$y_0 = 2^t m;$$

$$y_0 \leq y_{min}; \text{ and}$$

$$2^t(m+1) > y_{min}.$$

The process then identifies the four vertices of the bounding box with the following coordinates:

$$(x_0, y_0);$$

$$(x_0 + 2^k, y_0);$$

$$(x_0, y_0 + 2^k); \text{ and}$$

$$(x_0 + 2^k, y_0 + 2^k).$$

The vertices and position of the bounding box is determined so as to enclose the entire triangle image (as shown in the example of FIG. 3B). The process then ends.

Figure 5:
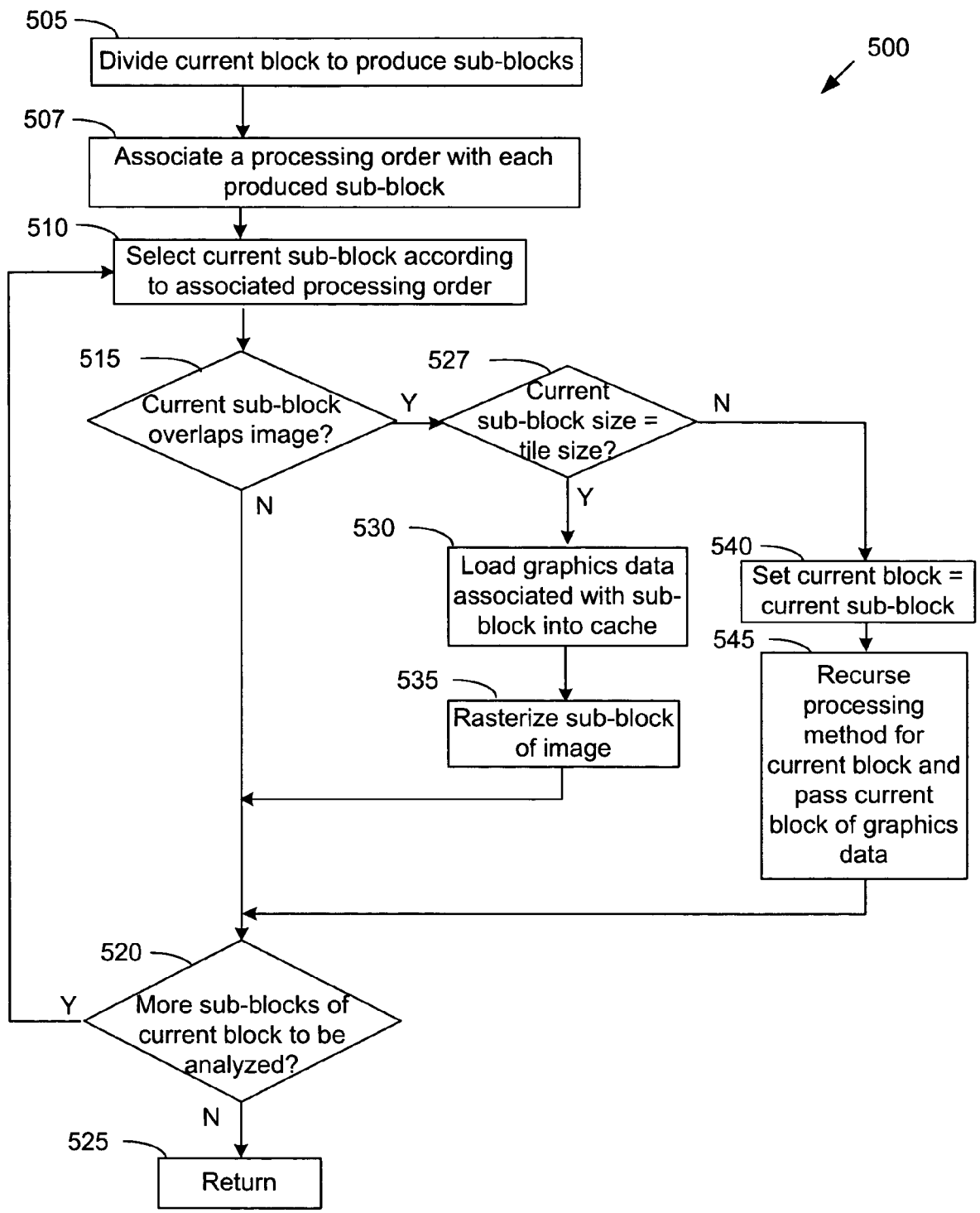
FIG. 5 is a flowchart of a recursive process that analyzes and rasterizes blocks of graphics data in an efficient "Z" pattern order.

Section II: Recursive Processing for Analyzing and Rasterizing Sub-Blocks of an Image FIG. 5 is a flowchart of a recursive processing technique 500 that analyzes and rasterizes blocks of graphics data in an efficient "Z" pattern order. In some embodiments, the recursive processing technique selects sub-blocks of graphics data to analyze and possibly rasterize in a particular order using a binary search subdivision process. The technique 500 is used in conjunction with an application that generates graphics data, a storage device that stores the generated graphics data, and a cache that temporarily stores data used for rasterization. FIG. 5 is described in relation to FIGS. 6A-E. FIG. 5 shows conceptual diagrams of an example image (as described by a block of graphics data) as it is processed by the recursive processing technique 500.

Figure 6A:
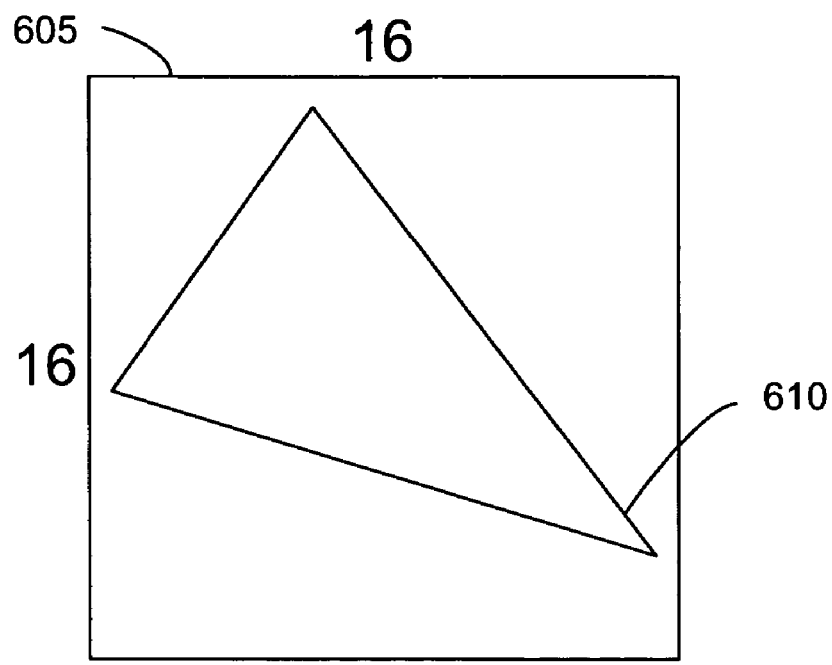
FIGS. 6A-E show conceptual diagrams of an example image as it is processed by the recursive processing technique of FIG. 5.

The recursive processing technique is called by the general process 200 of FIG. 2 at step 245 and receives a current block (bounding box) having an image (as described by the graphics data associated with the current block) from the general process 200. FIG. 6A shows a conceptual diagram of a current block 605 that comprises the bounding box 315 from FIG. 3B. As shown in example of FIG. 6A, the current block 605 comprises a 16×16 pixel array having a triangle image 610 for rasterization and display.

The recursive processing technique 500 begins by dividing (at 505) the current block to produce sub-blocks, (i.e., by dividing the pixel array of the current block to produce sub-pixel arrays). In some embodiments, the current block is divided vertically in the middle and horizontally in the middle to produce four equal-sized sub-blocks. As discussed above in relation to FIG. 2, the current block is a square having sides with a length (as measured in pixels) of a power of 2. As such, each sub-block will also be a square with sides having a length with a power of 2. In the example shown in FIG. 6B, the current block is a 16×16 pixel array so that each produced sub-block is an 8×8 pixel array.

Figure 6B:
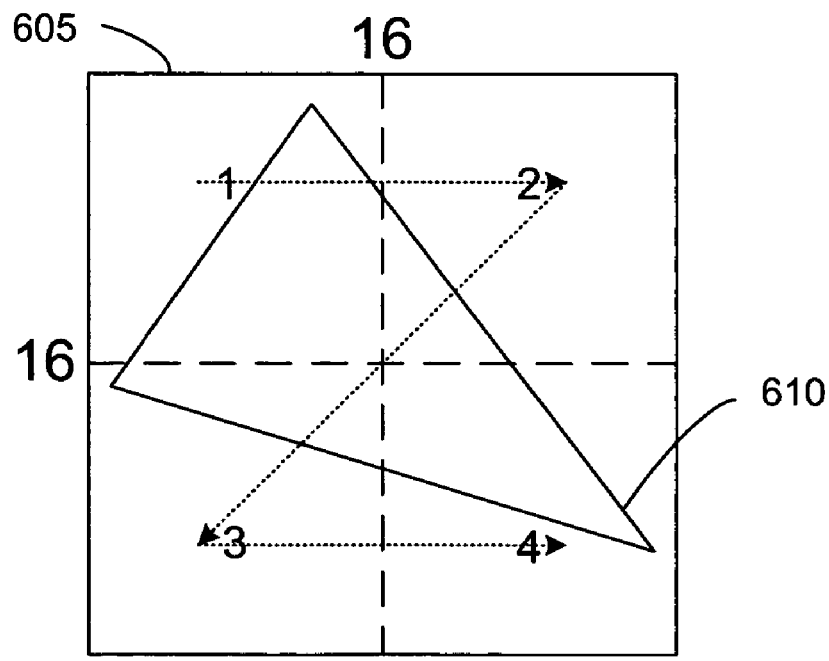

The technique then associates (at 507) a processing order with each produced sub-block according to a "Z" pattern (as illustrated in FIG. 6B). In other words, the sub-block (sub-block 1) in the upper left corner of the current block has an associated first position in the processing order, the sub-block (sub-block 2) in the upper right corner of the current block has an associated second position in the processing order, the sub-block (sub-block 3) in the lower left corner of the current block has an associated third position in the processing order, and the sub-block (sub-block 4) in the lower right corner of the current block has an associated fourth (last) position in the processing order. Statistically, this order of processing allows analysis and rasterization of pixels in a certain order for efficient cache utilization.

The technique 500 then selects (at 510) a current sub-block according to the associated processing order. As such, through multiple iterations of the technique 500, sub-block 1 is selected and processed first, sub-block 2 is selected and processed second, sub-block 3 is selected and processed third, and sub-block 4 is selected and processed last.

The technique 500 then determines (515) whether the current sub-block overlaps the image in the current block. In some embodiments, the technique does so by determining whether the current sub-block is completely within the image or intersects the image (i.e., the image is partially with in the sub-block and the sides of the image intersects with the sides of the sub-block). In some embodiments, the technique determines whether the current sub-block is completely within the image or the current sub-block intersects the image (i.e., whether the current sub-block has non-zero intersection with the image) by performing the following steps. First, the technique assumes that $e_1, e_1$, and $e_3$ are equations for the edges/sides of the triangle and $b_1, b_2, b_3$, and $b_4$ are equations for the edges/sides of the current sub-block. The technique then defines a number, $E_{ij}$, as the number of vertices that belong to $b_j$ that gives non-negative values when input into the edge equation of $e_i$. The technique then determines whether the following equation is true: $E_{1,1} + E_{1,3} + E_{2,1} + E_{2,3} + E_{3,1} + E_{3,3} = 12$. If so, the current sub-block is fully contained in the image. If not, the current sub-block is not fully contained in the image. The technique then determines if for some j the following equations are true: $E_{1,j} > 0$, $E_{2,j} > 0$, $E_{3,j} > 0$, and at least one vertex that belongs to $b_j$ lies within the bounding box defined by: $[x_{min}, x_{max}] \times [y_{min}, y_{max}]$. If so, the current sub-block intersects the image (i.e., has non-zero intersection with the image). If not, the current sub-block does not intersect the image.

If the current sub-block does not overlap the image, the current sub-block is disregarded and the technique then determines (at 520) whether there are more sub-blocks of the current block to be processed. If so, the technique continues at step 510 where a next current sub-block is selected according to the associated processing order. If not, the technique returns to the calling procedure. In the first iteration of the technique 500, the calling procedure is the general technique 200 whereas in later iterations, the calling procedure is the technique 500 itself.

If the technique 500 determines (at 515—Yes) that the current sub-block overlaps the image, the technique then proceeds to step 527. Note that in the example shown in FIG. 6B, sub-block 1 does overlap the image 610. At step 527, the technique determines whether the size of the current sub-block is equal to the size of the tile (determined at step 205 of the general technique 200). If so, the technique 500 loads (at 530) graphics data associated with the current sub-block (i.e., loads graphics data describing a portion of the image overlapping the current sub-block) from the storage device into the cache.

The technique then rasterizes (at 535) the current sub-block of the image (as described by the associated graphics data loaded to the cache). The current sub-block can be rasterized without further data loads from the storage to the cache since the cache size supports the current sub-block size. This is due to the fact that since the cache size supports the tile size, it also supports the current sub-block size since it has been determined (at 527—Yes) that the current sub-block size is equal to the tile size. In some embodiments, the entire current sub-block is rasterized before more graphics data is loaded to the cache.

If the technique determines (at 527—No) that the size of the current sub-block is not equal to the size of the tile, the technique 500 (the calling procedure) recurses for the current sub-block. The technique does so by setting (at 540) the current block as the current sub-block, calling itself (at 545) for the current block, and passing (at 545) the current block of graphics data to the called/recursed procedure. By recursing the technique 500 for the current sub-block, the technique continues to divide (at 505) the sub-block into further sub-blocks until the size of the tile is matched. When the size of the tile is matched by a sub-block, the graphics data associated with the sub-block is loaded to the cache and the sub-block is rasterized (at 530 and 535). When there are no more sub-blocks of a current block to be processed, the technique returns (at 525) to the calling procedure (the general technique 200 or the technique 500 itself).

Figure 6C:
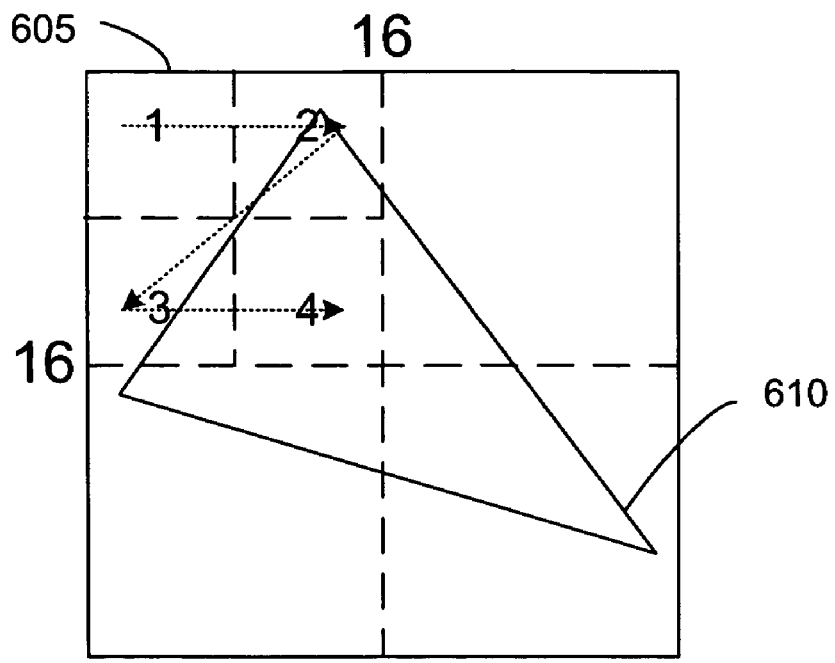

For the example shown in FIG. 6B, assume that the tile size is a 2×2 pixel array so that the tile size does not match the sub-block size (an 8×8 pixel array). As such, in the example shown in FIG. 6B, for the first iteration of the technique 500, the technique would recurse (at 545) for sub-block 1. As shown in the example of FIG. 6C, sub-block 1 is divided (at 505) into four 4×4 sub-blocks, the sub-blocks having an associated "Z" pattern processing order. Sub-block 1 would be the first sub-block to be selected (at 510) for analysis by the technique 500. Since sub-block 1 does not overlap the image 610, sub-block 1 would be disregarded and sub-block 2 would be selected (at 510) for analysis. Since sub-block 2 overlaps the image 610 but does not have a size equal to the tile size (since the sub-block size is 4×4 and the tile size is 2×2), the technique 500 recurses (at 545) again for sub-block 2.

Figure 6D:
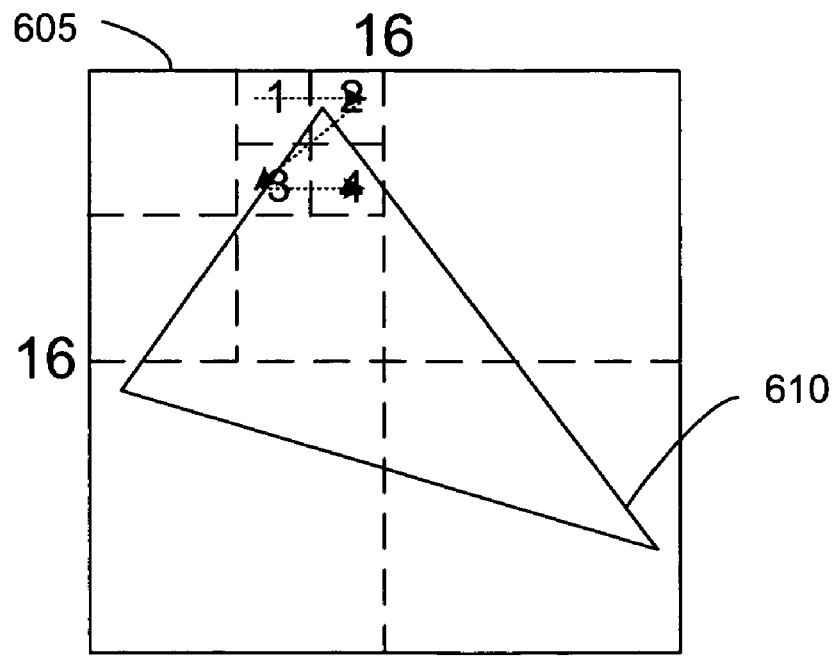

As shown in the example of FIG. 6D, sub-block 2 is divided (at 505) into four 2×2 sub-blocks, the sub-blocks having an associated "Z" pattern processing order. Sub-block 1 would be the first sub-block to be processed by the technique 500. Since sub-block 1 overlaps the image 610 and has a size equal to the tile size (since the sub-block size is 2×2 and the tile size is 2×2), the technique 500 loads (at 530) the graphics data associated with sub-block 1 to the cache and rasterizes (at 535) the sub-block. The technique then analyzes sub-block 2 and loads and rasterizes the graphics data associated with sub-block 2. The technique does the same for sub-block 3 and then sub-block 4.

After processing sub-block 4, the technique determines (at 520) that there are no more sub-blocks of the current block (sub-block 2 of FIG. 6C). As such, the technique returns (at 525) to the calling procedure (the technique 500) which has finished (at 545) processing sub-block 2 of FIG. 6C. The technique then determines (at 520) that there are more sub-blocks (sub-blocks 3 and 4 of FIG. 6C) of the current block (sub-block 1 of FIG. 6B) to be processed. The technique then selects (at 510) sub-block 3 of FIG. 6C for analysis.

Figure 6E:
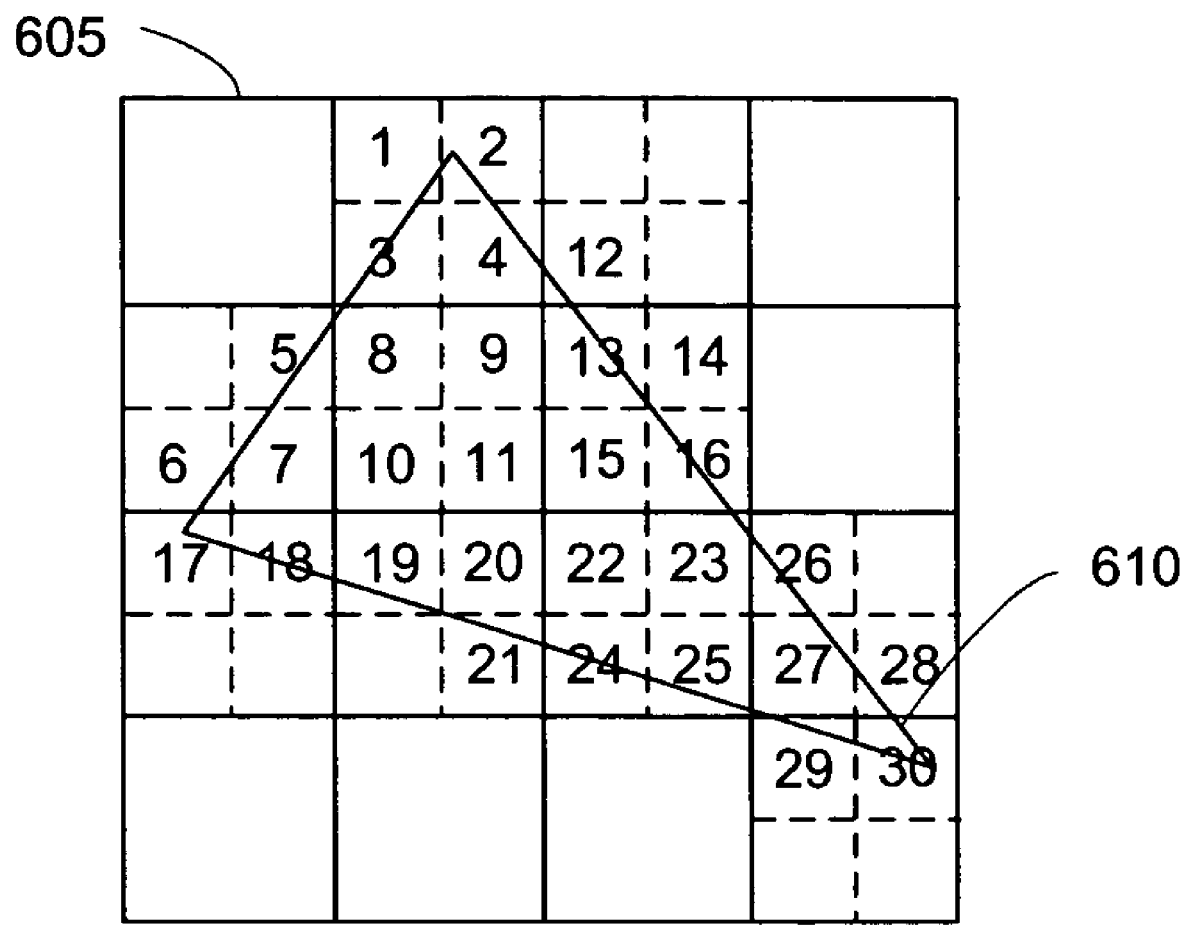

The technique 500 continues in such a manner until each sub-block of FIG. 6B is processed. During the processing of the sub-blocks, further sub-blocks are created recursively where some sub-blocks are loaded to the cache and rasterized while some are disregarded. FIG. 6E illustrates an example rasterization order of sub-blocks of an image 610 that is produced by the technique 500. The number in a sub-block indicates the rasterization order of the sub-block relative to the other sub-blocks. The lines and dashed lines indicate a division of a sub-block into further sub-blocks where the dashed lines indicate a sub-block having the same size as the tile size.

Section III: "Z" Pattern Scanning Order

In some embodiments, the techniques of the present invention implement a "Z" pattern order for scanning pixels of a block (pixel array) during rasterization of the block. For example, the "Z" pattern rasterization order may be used to scan an image within a bounding box (at step 235 of FIG. 2), or to scan a sub-block of an image (at step 535 of FIG. 5).

Figure 7:
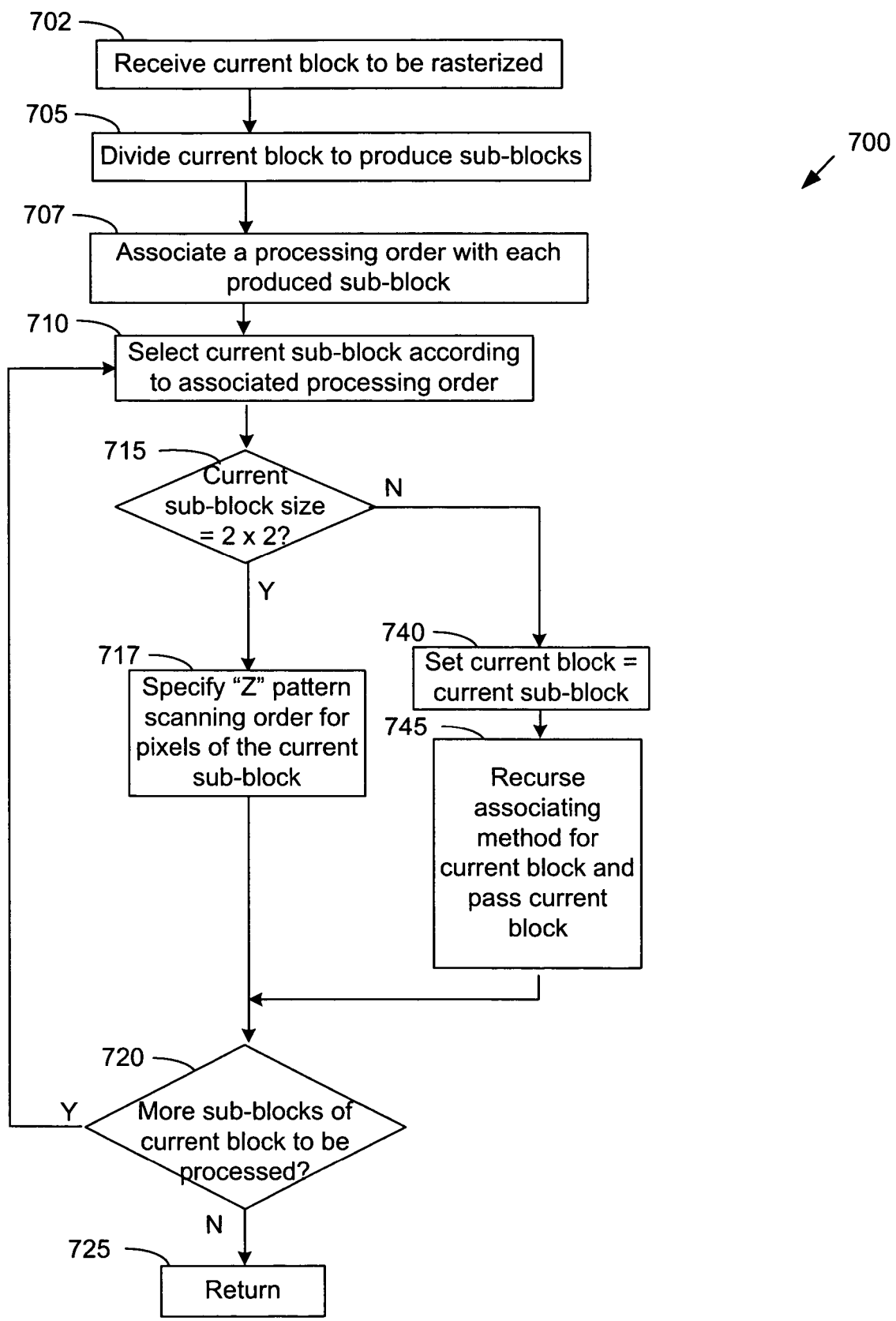
FIG. 7 is a flowchart of a recursive associating process that analyzes and specifies a scanning order for pixels of a block to be rasterized.
Figure 8A:
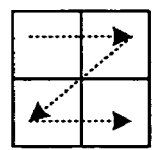
FIGS. 8A-C show "Z" pattern scanning orders 2×2, 4×4, and 8×8 blocks.

FIG. 7 is a flowchart of a recursive associating technique 700 that analyzes and specifies a scanning order for pixels of a block to be rasterized. The technique 700 can be applied to blocks having a size greater than 2×2. Pixels of 2×2 blocks are simply specified a "Z" scanning order (as shown in FIG. 8A). The recursive associating technique 700 specifies a scanning order for pixels of a block using a binary search subdivision process that recursively divides sub-blocks of the block into further sub-blocks until the sub-blocks are 2×2 in size. The technique then specifies a "Z" scanning order (as shown in FIG. 8A) for pixels of the 2×2 sub-block. The recursive associating technique 700 is similar to the recursive processing technique 500 of FIG. 5 where the tile size is equal to a 2×2 pixel array. Only those steps that differ from the recursive processing technique 500 are discussed in detail here.

The recursive associating technique 700 begins by receiving (at 702) a current block (pixel array) to be rasterized. In some embodiments, the block is a square with sides having a length (as measured in pixels) that is a power of 2. The block comprises a $2^r \times 2^r$ pixel array. The technique then divides (at 705) the current block to produce four equal-sized sub-blocks, each sub-block having sides with a length (as measured in pixels) that are a power of 2. The technique then associates (at 707) a processing order with each produced sub-block according to a "Z" pattern (as illustrated in FIG. 6B). Note that this processing order is not the same as the scanning order specified for a pixel: the processing order gives the order of analysis that the technique 700 follows to determine the scanning order, whereas, the scanning order specified for a pixel gives the order that the pixel will be scanned during rasterization.

The technique 700 then selects (at 710) a current sub-block according to the associated processing order. The technique determines (at 715) whether the size of the current sub-block is 2×2 in size. If so, the technique 700 specifies (at 717) a "Z" pattern scanning order for pixels of the current sub-block. In other words, the pixel in the upper left corner of the current sub-block has an associated first position in the scanning order, the pixel in the upper right corner of the current sub-block has an associated second position in the scanning order, the pixel in the lower left corner of the current sub-block has an associated third position in the scanning order, and the pixel in the lower left corner of the current sub-block has an associated fourth position in the scanning order.

The technique then determines (at 720) whether there are more sub-blocks of the current block to be processed. If so, the technique continues at step 710 where a next current sub-block is selected according to the associated processing order. If not, the technique returns to a calling procedure.

If the technique determines (at 715—No) that the size of the current sub-block is not 2×2 in size, the technique 700 (the calling procedure) recurses for the current sub-block. The technique does so by setting (at 740) the current block as the current sub-block, calling itself (at 745) for the current block, and passing (at 745) the current block to the called/recursed procedure. By recursing the technique 700 for the current sub-block, the technique continues to divide (at 705) the sub-block into further sub-blocks until a 2×2 sub-block is reached. When a 2×2 sub-block is reached, a "Z" pattern scanning order for pixels of the sub-block is specified (at 717). When there are no more sub-blocks of a current block to be processed, the technique returns (at 725) to the calling procedure.

Figure 8B:
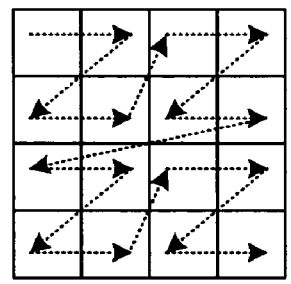
Figure 8C:
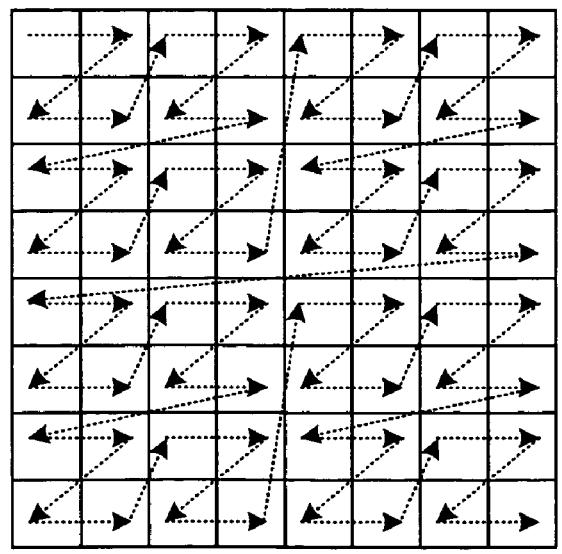

FIG. 8A shows the "Z" pattern scanning order for a 2×2 pixel array. FIGS. 8B-C show examples of a scanning order produced by the technique 700. FIG. 8B shows the resulting scanning order for a 4×4 block, and FIG. 8C shows the resulting scanning order for a 16×16 block. The "Z" pattern scanning order for scanning pixel arrays statistically improves the texture mapping cache hit rate.

Figure 9:
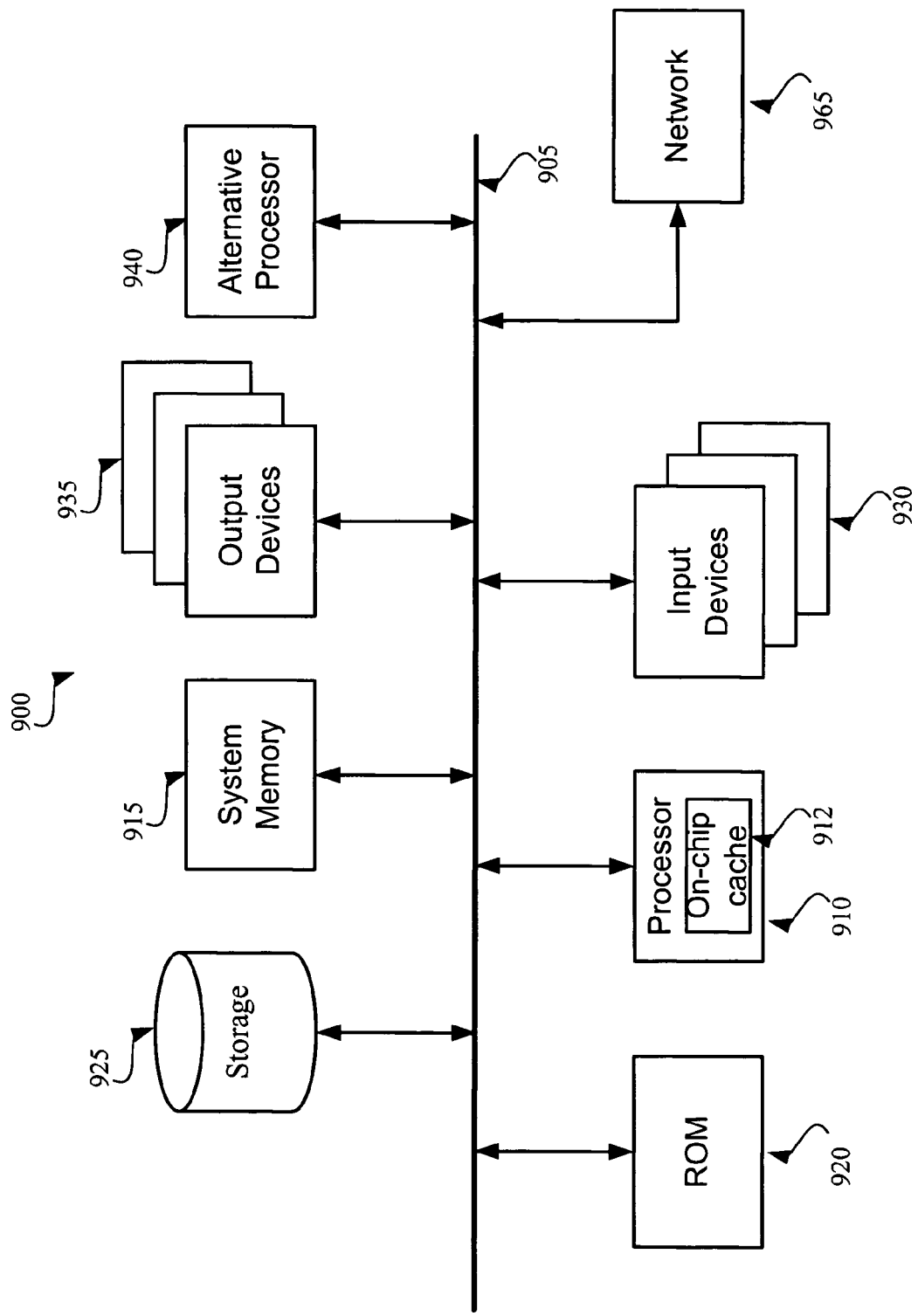
FIG. 9 presents a computer system 900 with which some embodiments of the invention are implemented.

FIG. 9 presents a computer system 900 with which some embodiments of the invention are implemented. In some embodiments, the techniques of the present invention are hard-coded into hardware devices dedicated specifically for graphics production and/or implemented in computer executable instructions stored in a computer readable medium (software).

The computer system 900 includes a bus 905, a processor 910, a system memory 915, a read-only memory 920, a permanent storage device 925, input devices 930, output devices 935, and an alternative processor 940.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925.

The read-only-memory (ROM) 920 stores static data and instructions that are needed by the processor 910 and other modules of the computer system. The permanent storage device 925, on the other hand, is read-and-write memory device. This device is a non-volatile memory unit that stores instruction and data even when the computer system 900 is off. Some embodiments of the invention use a mass-storage device (such as a magnetic or optical disk and its corresponding disk drive) as the permanent storage device 925. Other embodiments use a removable storage device (such as a floppy disk or zip® disk, and its corresponding disk drive) as the permanent storage device.

Like the permanent storage device 925, the system memory 915 is a read-and-write memory device. However, unlike storage device 925, the system memory is a volatile read-and-write memory, such as a random access memory (RAM). The system memory stores some of the instructions and data that the processor needs at runtime.

In some embodiments, instructions and/or data needed to perform methods of the present invention are stored in the system memory 915, the permanent storage device 925, the read-only memory 920, or any combination of the three. For example, the various memory units may contain instructions of an application and/or graphics data generated by the application. In some embodiments, the system memory 915 and/or the permanent storage device 925 comprise a cache and/or buffer.

From these various memory units, the processor 910 retrieves instructions to execute and data to process in order to perform the processes of the present invention. In some embodiments, the processor 910 uses an on-chip cache 912 to hold data recently accessed or produced by the processor 910.

In some embodiments, the alternative processor 940 executes instructions and processes data to perform the processes of the present invention.

The bus 905 also connects to the input and output devices 930 and 935. The input devices 930 enable a user to communicate information and select commands to the computer system 900. The input devices 930 include alphanumeric keyboards and cursor-controllers. The output devices 935 print or display images generated by the computer system 900. The output devices include printers and display devices, such as cathode ray tubes (CRT) or liquid crystal displays (LCD).

Finally, as shown in FIG. 9, the bus 905 also couples the computer system 900 to a network 965 through, for example, a network adapter (not shown). In this manner, the computer system 900 can be a part of a network of computers (such as a local area network ("LAN"), a wide area network ("WAN"), or an Intranet) or a network of networks (such as the Internet). Any or all of the components of the computer system 900 may be used in conjunction with the present invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal (presumably previously defined broadly). In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A device comprising:
a cache configured to store data, said cache comprising a size; and
a processor, coupled to said cache, configured to determine a size and a position of a bounding box that entirely encompasses a graphics image, to subdivide said bounding box to generate a plurality of sub-blocks upon determining that said size of said bounding box is not equal to said size of said cache, to process said sub-blocks based on a substantially Z-shaped pattern block processing order to determine when said sub-blocks overlap said graphics image, to subdivide said sub-blocks, upon determining that said sub-blocks have individual sizes that are not equal to said size of said cache, into a plurality of tiles for sub-blocks comprising graphics image data, such that each of said tiles is sized equal to said size of said cache, to load data, associated with a tile, into said cache, and to utilize said data in said cache to generate pixels for said associated tile of said graphics image.

2. The device as set forth in claim 1, said processor further configured to a) determine whether a sub-block within said sub-blocks overlaps said graphics image, b) determine whether a sub-block size of said sub-block equals said size of said cache if said sub-block overlaps said graphics image, c) subdivide said sub-block into additional sub-blocks if said sub-block overlaps said graphics image and said sub-block size does not equal said tile size of said cache, d) select an additional sub-block within said sub-blocks based on said substantially Z-shaped pattern block processing order, and repeat elements a, b, c, and d until said sub-block size equals said size of said cache.

3. The device as set forth in claim 1, said processor further configured to determine a bounding box size $2^k \times 2^k$, wherein K comprises an integer value.

4. The device as set forth in claim 1, wherein said tile size comprises $2^k \times 2^k$, wherein K comprises an integer value.

5. The device as set forth in claim 1, said processor further configured to assign a pixel processing order to generate said pixels.

6. An apparatus for cache efficient graphics rasterization comprising:
means for selecting a tile size equal to a size of a cache;
means for determining a size and a position of a bounding box that entirely encompasses a graphics image;
means for subdividing said bounding box to generate a plurality of sub-blocks upon determining that said size of said bounding box is not equal to said size of said cache;
means for processing said sub-blocks, based on a substantially Z-shaped pattern block processing order to determine when said sub-blocks overlap said graphics image, and subdividing said sub-blocks, upon determining that said sub-blocks have individual sizes that are not equal to said size of said cache, into a plurality of tiles for sub-blocks comprising graphics image data, such that each of said tiles is sized equal to said tile size;
means for loading data, associated with a tile, into said cache; and
means for utilizing said data in said cache to generate pixels for said associated tile of said graphics image.

7. The apparatus as set forth in claim 6, wherein the means for processing sub-blocks comprises:
a) means for determining whether a sub-block within said sub-blocks overlaps said graphics image;
b) means for determining whether a sub-block size of said sub-block equals said tile size if said sub-block overlaps said graphics image;
c) means for subdividing said sub-block into additional sub-blocks if said sub-block overlaps said graphics image and said sub-block size does not equal said size of said cache;
d) means for selecting an additional sub-block within said sub-blocks based on said substantially Z-shaped pattern block processing order; and
e) means for repeating elements a, b, c, and d until said sub-block size equals said tile size.

8. The apparatus as set forth in claim 6, wherein means for determining a bounding box that encompasses the graphics image comprises means for determining a bounding box size $2^k \times 2^k$, wherein K comprises an integer value.

9. The apparatus as set forth in claim 6, wherein said tile size comprises $2^k \times 2^k$, wherein K comprises an integer value.

10. The apparatus as set forth in claim 6, wherein means for utilizing said data in said cache to generate pixels for said sub-blocks comprises assigning a pixel processing order to generate said pixels.

11. A method for cache efficient graphics rasterization comprising:
receiving a graphics image;
selecting a tile size equal to a size of a cache;
determining a size and a position of a bounding box that entirely encompasses said graphics image;
subdividing said bounding box to generate a plurality of sub-blocks upon determining that said size of said bounding box is not equal to said size of said cache;
processing said sub-blocks, based on a substantially Z-shaped pattern block processing order to determine when said sub-blocks overlap said graphics image, and subdividing said sub-blocks, upon determining that said sub-blocks have individual sizes that are not equal to said size of said cache, into a plurality of tiles for sub-blocks comprising graphics image data, such that each of said tiles is sized equal to said tile size;
loading data, associated with a tile, into said cache; and
utilizing said data in said cache to generate pixels for said associated tile of said graphics image.

12. The method as set forth in claim 11, wherein processing sub-blocks comprises:
a) determining whether a sub-block within said sub-blocks overlaps said graphics image;
b) determining whether a sub-block size of said sub-block equals said tile size if said sub-block overlaps said graphics image;
c) subdividing said sub-block into additional sub-blocks if said sub-block overlaps said graphics image and said sub-block size does not equal said size of said cache;
d) selecting an additional sub-block within said sub-blocks based on said substantially Z-shaped pattern block processing order; and
repeating elements a, b, c, and d until said sub-block size equals said tile size.

13. The method as set forth in claim 11, wherein determining a bounding box that encompasses graphics image comprises determining a bounding box size $2^k \times 2^k$, wherein K comprises an integer value.

14. The method as set forth in claim 11, wherein said tile size comprises $2^k \times 2^k$, wherein K comprises an integer value.

15. The method as set forth in claim 11 wherein utilizing said data in said cache to generate pixels for said sub-blocks comprises assigning a pixel processing order to generate said pixels.

16. A computer readable medium embodying a set of instructions, wherein the set of instructions when executed by one or more processors comprises:
receiving a graphics image;
selecting a tile size equal to a size of a cache;
determining a size and a position of a bounding box that entirely encompasses said graphics image;
subdividing said bounding box to generate a plurality of sub-blocks upon determining that said size of said bounding box is not equal to said size of said cache;
processing said sub-blocks, based on a substantially Z-shaped pattern block processing order to determine when said sub-blocks overlap said graphics image, and subdividing said sub-blocks, upon determining that said sub-blocks have individual sizes that are not equal to said size of said cache, into a plurality of tiles for sub-blocks comprising graphics image data, such that each of said tiles is sized equal to said tile size;
loading data, associated with a tile, into said cache; and
utilizing said data in said cache to generate pixels for said associated tile of said graphics image.

17. The computer readable medium as set forth in claim 16, wherein processing sub-blocks comprises:
a) determining whether a sub-block within said sub-blocks overlaps said graphics image;
b) determining whether a sub-block size of said sub-block equals said tile size if said sub-block overlaps said graphics image;
c) subdividing said sub-block into additional sub-blocks if said sub-block overlaps said graphics image and said sub-block size does not equal said size of said cache;
d) selecting an additional sub-block within said sub-blocks based on said substantially Z-shaped pattern block processing order; and
repeating elements a, b, c, and d until said sub-block size equals said tile size.

18. The computer readable medium as set forth in claim 16, wherein determining a bounding box that encompasses graphics image comprises determining a bounding box size $2^k \times 2^k$, wherein K comprises an integer value.

19. The computer readable medium as set forth in claim 16, wherein said tile size comprises $2^k \times 2^k$, wherein K comprises an integer value.

20. The computer readable medium as set forth in claim 16, wherein utilizing said data in said cache to generate pixels for said sub-blocks comprises assigning a pixel processing order to generate said pixels.

21. An integrated circuit comprising:
a cache configured to store data, said cache comprising a size; and
a processor, coupled to said cache, configured to determine a size and a position of a bounding box that entirely encompasses a graphics image, to subdivide said bounding box to generate a plurality of sub-blocks upon determining that said size of said bounding box is not equal to said size of said cache, to process said sub-blocks based on a substantially Z-shaped pattern block processing order to determine when said sub-blocks overlap said graphics image, to subdivide said sub-blocks, upon determining that said sub-blocks have individual sizes that are not equal to said size of said cache, into a plurality of tiles for sub-blocks comprising graphics image data, such that each of said tiles is sized equal to said size of said cache, to load data, associated with a tile, into said cache, and to utilize said data in said cache to generate pixels for said associated tile of said graphics image.

22. The integrated circuit as set forth in claim 21, wherein said processor is further configured to a) determine whether a sub-block within said sub-blocks overlaps said graphics image, b) determine whether a sub-block size of said sub-block equals said size of said cache if said sub-block overlaps said graphics image, c) subdivide said sub-block into additional sub-blocks if said sub-block overlaps said graphics image and said sub-block size does not equal said size of said cache, d) select an additional sub-block within said sub-blocks based on said substantially Z-shaped pattern block processing order, and repeat elements a, b, c, and d until said sub-block size equals said size of said cache.

23. The integrated circuit as set forth in claim 21, wherein said processor is further configured to determine a bounding box size $2^k \times 2^k$, wherein K comprises an integer value.

24. The integrated circuit as set forth in claim 21, wherein said tile size comprises $2^k \times 2^k$, wherein K comprises an integer value.

25. The integrated circuit as set forth in claim 21, wherein said processor is further configured to assign a pixel processing order to generate said pixels.

26. A device comprising:
a cache configured to store data, said cache comprising a size; and
a processor, coupled to said cache, configured to subdivide a graphics image into a plurality of sub-blocks, to process said sub-blocks based on a substantially Z-shaped pattern block processing order to determine when said sub-blocks overlap said graphics image, and subdivide said sub-blocks, upon determining that said sub-blocks have individual sizes that are not equal to said size of said cache, into a plurality of tiles for sub-blocks comprising graphics image data, such that each of said tiles is sized equal to said size of said cache, to load data, associated with a tile, into said cache, and to use a substantially Z-shaped pattern scanning order to scan and rasterize at least a portion of said data in said cache that is associated with said tile.

27. The device as set forth in claim 26, wherein the processor is further configured to:
process said data in said cache that is associated with said tile;
subdivide said data into sub-blocks of data until each of said sub-blocks has a predetermined size; and
for each sub-block of data having said predetermined size, use the substantially Z-shaped pattern scanning order to scan and rasterize pixels contained within said sub-block of data.

28. The device as set forth in claim 27, wherein said predetermined size comprises a 2×2 size in pixels.

29. The device as set forth in claim 26, wherein the processor is configured to:
process a sub-block of data in said cache that is associated with said tile; and
use the substantially Z-shaped pattern scanning order to scan and rasterize pixels within said sub-block, wherein a pixel in an upper-left corner of said sub-block has a first position in said scanning order, wherein a pixel in an upper-right corner of said sub-block has a second position in said scanning order, wherein a pixel in a lower-left corner of said sub-block has a third position in said scanning order, and wherein a pixel in a lower-right corner of said sub-block has a fourth position in said scanning order.

30. The device as set forth in claim 26, wherein the processor is further configured to:
   determine a bounding box that entirely encompasses graphics image; and
   sub-divide said bounding box to generate said sub-blocks.

31. An apparatus for cache efficient graphics rasterization comprising:
   means for selecting a tile size equal to a size of a cache;
   means for subdividing said graphics image into a plurality of sub-blocks;
   means for processing said sub-blocks, based on a substantially Z-shaped pattern block processing order to determine when said sub-blocks overlap said graphics image, and subdividing said sub-blocks, upon determining that said sub-blocks have individual sizes that are not equal to said size of said cache, into a plurality of tiles for sub-blocks comprising graphics image data, such that each of said tiles is sized equal to said tile size;
   means for loading data, associated with a tile, into said cache; and
   means for using a substantially Z-shaped pattern scanning order to scan and rasterize at least a portion of said data in said cache that is associated with said tile.

32. The apparatus as set forth in claim 31, further comprising:
   means for processing said data in said cache that is associated with said tile;
   means for subdividing said data into sub-blocks of data until each of said sub-blocks has a predetermined size; and
   for each sub-block of data having said predetermined size, means for using the substantially Z-shaped pattern scanning order to scan and rasterize pixels contained within said sub-block of data.

33. The apparatus as set forth in claim 32, wherein said predetermined size comprises a 2×2 size in pixels.

34. The apparatus as set forth in claim 31, wherein the means for using the substantially Z-shaped pattern scanning order comprises:
   means for processing a sub-block of data in said cache that is associated with said tile; and
   means for using the substantially Z-shaped pattern scanning order to scan and rasterize pixels within said sub-block, wherein a pixel in an upper-left corner of said sub-block has a first position in said scanning order, wherein a pixel in an upper-right corner of said sub-block has a second position in said scanning order, wherein a pixel in a lower-left corner of said sub-block has a third position in said scanning order, and wherein a pixel in a lower-right corner of said sub-block has a fourth position in said scanning order.

35. The apparatus as set forth in claim 31, further comprising:
   means for determining a bounding box that entirely encompasses graphics image; and
   means for sub-dividing said bounding box to generate said sub-blocks.

36. A method for cache efficient graphics rasterization comprising:
   receiving a graphics image;
   selecting a tile size equal to a size of a cache;
   subdividing said graphics image into a plurality of sub-blocks;
   processing said sub-blocks, based on a substantially Z-shaped pattern block processing order to determine when said sub-blocks overlap said graphics image, and subdividing said sub-blocks, upon determining that said sub-blocks have individual sizes that are not equal to said size of said cache, into a plurality of tiles for sub-blocks comprising graphics image data, such that each of said tiles is sized equal to said tile size;
   loading data, associated with a tile, into said cache; and
   using a substantially Z-shaped pattern scanning order to scan and rasterize at least a portion of said data in said cache that is associated with said tile.

37. The method as set forth in claim 36, further comprising:
   processing said data in said cache that is associated with said tile;
   subdividing said data into sub-blocks of data until each of said sub-blocks has a predetermined size; and
   for each sub-block of data having said predetermined size, using the substantially Z-shaped pattern scanning order to scan and rasterize pixels contained within said sub-block of data.

38. The method as set forth in claim 37, wherein said predetermined size comprises a 2×2 size in pixels.

39. The method as set forth in claim 36, wherein using the substantially Z-shaped pattern scanning order comprises:
   processing a sub-block of data in said cache that is associated with said tile; and
   using the substantially Z-shaped pattern scanning order to scan and rasterize pixels within said sub-block, wherein a pixel in an upper-left corner of said sub-block has a first position in said scanning order, wherein a pixel in an upper-right corner of said sub-block has a second position in said scanning order, wherein a pixel in a lower-left corner of said sub-block has a third position in said scanning order, and wherein a pixel in a lower-right corner of said sub-block has a fourth position in said scanning order.

40. The method as set forth in claim 36, further comprising:
   determining a bounding box that entirely encompasses graphics image; and
   sub-dividing said bounding box to generate said sub-blocks.

41. A computer readable medium embodying a set of instructions, wherein the set of instructions when executed by one or more processors comprises:
   receiving a graphics image;
   selecting a tile size equal to a size of a cache;
   subdividing said graphics image into a plurality of sub-blocks;
   processing said sub-blocks, based on a substantially Z-shaped pattern block processing order to determine when said sub-blocks overlap said graphics image, and subdividing said sub-blocks, upon determining that said sub-blocks have individual sizes that are not equal to said size of said cache, into a plurality of tiles for sub-blocks comprising graphics image data, such that each of said tiles is sized equal to said tile size;
   loading data, associated with a tile, into said cache; and
   using a substantially Z-shaped pattern scanning order to scan and rasterize at least a portion of said data in said cache that is associated with said tile.

42. The computer readable medium as set forth in claim 41, wherein the set of instructions when executed by the one or more processors further comprises:
   processing said data in said cache that is associated with said tile;

subdividing said data into sub-blocks of data until each of said sub-blocks has a predetermined size; and for each sub-block of data having said predetermined size, using the substantially Z-shaped pattern scanning order to scan and rasterize pixels contained within said sub-block of data.

43. The computer readable medium as set forth in claim 42, wherein said predetermined size comprises a 2×2 size in pixels.

44. The computer readable medium as set forth in claim 41, wherein using the substantially Z-shaped pattern scanning order comprises:

processing a sub-block of data in said cache that is associated with said tile; and using the substantially Z-shaped pattern scanning order to scan and rasterize pixels within said sub-block, wherein a pixel in an upper-left corner of said sub-block has a first position in said scanning order, wherein a pixel in an upper-right corner of said sub-block has a second position in said scanning order, wherein a pixel in a lower-left corner of said sub-block has a third position in said scanning order, and wherein a pixel in a lower-right corner of said sub-block has a fourth position in said scanning order.

45. The computer readable medium as set forth in claim 41, wherein the set of instructions when executed by the one or more processors further comprises:

determining a bounding box that entirely encompasses graphics image; and sub-dividing said bounding box to generate said sub-blocks.

46. An integrated circuit comprising:

a cache configured to store data, said cache comprising a size; and a processor, coupled to said cache, configured for subdividing a graphics image into a plurality of sub-blocks, for processing said sub-blocks, based on a substantially Z-shaped pattern block processing order to determine when said sub-blocks overlap said graphics image, to subdivide said sub-blocks, upon determining that said sub-blocks have individual sizes that are not equal to said size of said cache, into a plurality of tiles for sub-blocks comprising graphics image data, such that each of said tiles is sized equal to said size of said cache, for loading data, associated with a tile, into said cache, and for using a substantially Z-shaped pattern scanning order to scan and rasterize at least a portion of said data in said cache that is associated with said tile.

47. The integrated circuit as set forth in claim 46, wherein the processor is further configured to:

process said data in said cache that is associated with said tile;

subdivide said data into sub-blocks of data until each of said sub-blocks has a predetermined size; and for each sub-block of data having said predetermined size, use the substantially Z-shaped pattern scanning order to scan and rasterize pixels contained within said sub-block of data.

48. The integrated circuit as set forth in claim 47, wherein said predetermined size comprises a 2×2 size in pixels.

49. The integrated circuit as set forth in claim 46, wherein the processor is configured to:

process a sub-block of data in said cache that is associated with said tile; and use the substantially Z-shaped pattern scanning order to scan and rasterize pixels within said sub-block, wherein a pixel in an upper-left corner of said sub-block has a first position in said scanning order, wherein a pixel in an upper-right corner of said sub-block has a second position in said scanning order, wherein a pixel in a lower-left corner of said sub-block has a third position in said scanning order, and wherein a pixel in a lower-right corner of said sub-block has a fourth position in said scanning order.

50. The integrated circuit as set forth in claim 46, wherein the processor is further configured to:

determine a bounding box that entirely encompasses graphics image; and sub-divide said bounding box to generate said sub-blocks.

* * * * *

UNITED STATES PATENT AND TRADEMARK OFFICE
CERTIFICATE OF CORRECTION

| | | |
|---|---|---|
| PATENT NO. | : 7,505,043 B2 | Page 1 of 1 |
| APPLICATION NO. | : 10/930408 | |
| DATED | : March 17, 2009 | |
| INVENTOR(S) | : Bourd et al. | |

It is certified that error appears in the above-identified patent and that said Letters Patent is hereby corrected as shown below:

Column 13, line 34, claim 2: "said tile size" to read as --said size--

Column 13, line 41, claim 3: "K comprises" to read as --k comprises--

Column 13, line 43, claim 4: "K comprises" to read as --k comprises--

Column 14, line 20, claim 8: "K comprises" to read as --k comprises--

Column 14, line 22, claim 9: "K comprises" to read as --k comprises--

Column 14, line 64, claim 13: "K comprises" to read as --k comprises--

Column 14, line 67, claim 14: "K comprises" to read as --k comprises--

Column 15, line 44, claim 18: "K comprises" to read as --k comprises--

Column 15, line 46, claim 19: "K comprises" to read as --k comprises--

Column 16, line 19, claim 23: "K comprises" to read as --k comprises--

Column 16, line 21, claim 24: "K comprises" to read as --k comprises--

Signed and Sealed this

Seventeenth Day of May, 2011

David J. Kappos
*Director of the United States Patent and Trademark Office*